United States Patent Office 3,766,159
Patented Oct. 16, 1973

3,766,159
METHOD FOR CONTROLLING THE REACTION RATE IN THE SUSPENSION-POLYMERIZATION OF VINYL CHLORIDE
Shunichi Koyanagi and Shigenobu Tajima, Naoetsu, Japan, assignors to Shinetsu Chemical Company
No Drawing. Filed May 4, 1971, Ser. No. 140,290
Claims priority, application Japan, June 11, 1970, 45/50,881
Int. Cl. C08f 3/22
U.S. Cl. 260—92.8 W        8 Claims

ABSTRACT OF THE DISCLOSURE

The polymerization is carried out in an aqueous polymerization system containing a suspending or dispersing agent and a polymerization catalyst. Gaseous vinyl chloride monomer produced during the reaction is condensed. Concurrently, a polymerization inhibitor is added to the system. The condensed gaseous vinyl chloride monomer absorbs the polymerization inhibitor. The combined condensed monomer and inhibitor are adsorbed by suspending particles including the monomer. The adsorbed condensed monomer is then vaporized. The polymerization system is thereby agitated. Uniform distribution of the polymerization system is insured. Control of the polymerization reaction rate is facilitated.

---

This invention relates to an improved method for suspension-polymerizing vinyl chloride. The suspension polymerization of vinyl chloride has generally been conducted in an aqueous medium containing a synthetic or natural high-molecular-weight protective colloidal suspending agent, such as partially saponified polyvinyl acetate, cellulose ether, or gelatin, or a solid-dispersing agent such as calcium carbonate, magnesium, carbonate, barium sulfate, titanium white or alumina, and, as a catalyst, an organic peroxide such as lauroyl peroxide, benzoyl peroxide, isopropyl peroxydicarbonate, acetyl cyclohexylsulfonyl peroxide, or an azo compound such as azobisisobutyronitrile or dimethylvaleronitrile. In carrying out the polymerization, the aqueous medium containing the above-given additives is charged into a pressure-proof polymerization vessel, equipped with a stirrer and a cooling jacket, and while the temperature inside the vessel is kept between 30° C. and 80° C., the mixture is vigorously stirred. If for some reason, such as a power failure, the stirring and cooling of the polymerization system is suspended accumulated heat may accelerate the polymerization and endanger the operation of the process. When this occurs, the polymerization reaction has to be restrained. To cope with such a situation, it has been proposed to add to the reaction system a polymerization inhibitor, such as for example hydroquinone, bisphenol or tertiary butyl catechol. Purging the unreacted monomer from the vessel and rapidly reducing the temperature inside the polymerization vessel are other methods which have been proposed.

In order to meet increasing demand and reduce production costs in the production of vinyl chloride polymer, it has been necessary to employ larger and larger polymerization vessels. However, this is accompanied by the disadvantage that the surface area of the vessel does not increase in proportion to the increase in volume of the vessel. Consequently, the area of the cooling jacket needed for heat transfer becomes insufficient. On the other hand, if, as an emergency measure, a large amount of monomer is purged in order to stop the polymerization reaction, there is danger of an explosion. Furthermore, the addition of a polymerization inhibitor and the rapid reduction of the temperature inside the polymerization vessel requires the installation of a large dynamo for stirring or cooling the polymerization system. Therefore the above-given known methods for stopping the polymerization reaction, as an emergency measure, cannnot be employed as such unless some practical safety measure has been established.

The present invention has been made to provide a method, free from the above-given disadvantages, for controlling at will the velocity of polymerization taking place in the polymerization vessel. In the instant method, vinyl chloride or a mixture of vinyl monomers containing vinyl chloride as its main component is subjected to suspension polymerization in the presence of a suspending agent and a catalyst. The polymerization is conducted in a vessel which is provided with a condenser. The condenser is installed either in the portion of the vessel containing the gaseous phase or outside the vessel and in communication with said gaseous phase. The condenser functions to control polymerization velocity. A polymerization inhibitor is added to the polymerization system during the operation of the condenser. When vinyl chloride is subjected to suspension polymerization while the condenser is in operation, scale deposits on the condenser and on the inside walls of the conduit pipe. This virtually blocks the operation of the condenser. What is worse, scale which is dislodged from the walls mixes with the product polymer and degrades its quality. In view of the above, it is generally believed that in the suspension polymerization of vinyl chloride it is not possible to employ a condenser. However, the results of our experiments have proven that the use of a condenser is very effective in controlling the polymerization velocity in the suspension polymerization of vinyl chloride.

If, during the suspension polymerization of vinyl chloride, it becomes necessary for some reason or other to slow down or entirely stop the polymerization reaction, or if, due to a power failure or some other external cause, the stirring or cooling is halted, thereby rendering emergency stoppage of the polymerization reaction essential, the addition of a polymerization inhibitor to the polymerization system, while the condenser is in operation, will effectively solve the problem. The gaseous monomer in the polymerization vessel will be condensed by the operation of the condenser, and the condensed monomer, after absorbing the polymerization inhibitor, will be re-adsorbed by the suspending particles. At the same time, the monomer held by the particles of the suspending agent will be vaporized thereby agitating the whole polymerization system. Thus even if the operation of the stirrer is stopped, the polymerization inhibitor will be uniformly dispersed in the polymerization system, and control of the polymerization reaction can be accomplished rapidly and with ease.

The condenser employed in the instant method can be of any type. It may be installed either within the polymerization vessel or outside the vessel. In either case the condenser should communicate with the gaseous phase of the polymerization system contained in the vessel. The factors which should be taken into consideration in selecting a condenser of appropriate volume, are the volume and the area of the polymerization vessel available for conduction of heat, the polymerization velocity (which is dependent upon the kind and amount of catalyst employed), the polymerization temperature, and the properties desired of the polymer to be prepared. Generally speaking, it is advisable that $A/V$, or the ratio of the area, [$MA^2$], of the condenser to the volume of the polymerization vessel, [$MV^3$], be at least 0.01 or more. Preferably, $A/V$ should be between 0.5 and 2.0. The condenser may be operated only at the time the polymerization inhibitor is added. However, if it has been in operation before the polymerization has sufficiently progressed, or if it has been utilized as a preparatory stirring before the polymerization is started, so much the better, as scale deposition is thereby substantially reduced.

As the polymerization inhibitor one may employ any of the prior art known substances, for example, hydroquinone, methyl hydroquinone, nitrobenzene, bisphenol, tertiary-butylcatechol, etc. In determining the amount of polymerization inhibitor to be added, one should take into consideration the amount of monomer present in the polymerization system, the kind of catalyst employed, the kind of polymerization inhibitor employed, the rate of conversion at the time of the addition of the polymerization inhibitor, and the polymerization velocity. If the polymerization inhibitor is to be added merely for the purpose of slowing down the polymerization reaction, then about 10 p.p.m. of it, based on the amount of monomer remaining in the polymerization vessel, will be sufficient. If complete stoppage of the polymerization reaction is desired, then from 500 to 3,000 p.p.m. or more of the polymerization inhibitor should be added. It should be kept in mind that the amount of polymerization inhibitor employed should be such that it will not act to degrade the heat stability and melt flow of the polymer. If the polymerization reaction has to be stopped as an emergency measure, occasioned for example by a power failure, the polymerization inhibitor should be added as soon as possible so that the potential stirring energy can be utilized. Therefore it is recommended that the addition of the polymerization inhibitor be done automatically. It is preferred that the inhibitor be introduced into the polymerization system in as many spots as possible. It may be introduced either as is or in a solvent which is inert to the polymerization reaction. If, at the time of the addition of the polymerization inhibitor, an inert gas such as nitrogen is introduced at the bottom of the polymerization vessel, a desirable stirring effect will be imparted to the system.

As mentioned before, the method of the present invention is applicable to the suspension polymerization of vinyl chloride. It may also be employed in the copolymerization of vinyl monomers containing vinyl chloride as its main component. Such copolymerizable monomers are exemplified by vinyl ester, vinyl ether, acrylic acid or methacrylic acid and esters thereof, aromatic vinyl monomers, maleic acid and anhydrides and esters thereof, vinylidene halide, vinyl halides excepting vinyl chloride, and monoolefin.

The following examples are offered only for the purpose of illustrating the method of the present invention and not for the purpose of limiting same.

EXAMPLE 1

A stainless steel polymerization vessel (capacity: 1000 liters), having a stirrer disposed therein and an external multitubular condenser (heat-exchange area: 1 m.$^2$), was evacuated and filled with nitrogen gas. 250 kg. of vinyl chloride, 500 kg. of deionized water, 0.1 wt. percent, based on the weight of vinyl chloride, of partially saponified polyvinyl acetate, as a suspending agent, and 0.025 wt. percent, based on the weight of vinyl chloride, of dimethylvaleronitrile, as a catalyst, were charged into the vessel. The temperature inside the vessel was raised to 57° C., and polymerization was initiated. 7 hours after the start of the polymerization, an accidental stoppage of electric power was assumed to have taken place, and supply of cold water to the condenser was started. 2 seconds later, 1000 p.p.m., based on the weight of the monomer, of 30% solution of tertiary-butylcatechol in methanol was added to the system. After 10 minutes, 97% of the polymerization reaction was halted.

As a comparison (control 1), a similar experiment was conducted using a polymerization vessel as described above. This vessel, however, was not provided with a condenser. In this case, even 40 minutes after the stoppage of stirring, only 70% of the polymerization reaction was halted.

EXAMPLES 2 AND 3

Two experiments similar to that described in Example 1 were conducted. In both of these experiments a stoppage of electricity was assumed to have taken place 8 hours after the start of the polymerization reaction. The polymerization inhibitor was added 3 minutes after the cessation of the stirring, when no stirring energy was retained. In the second case only, 20 liters of nitrogen gas was introduced into the polymerization vessel at the vessel bottom. The results obtained were as given in Table 1.

TABLE 1

| Experiment number | Control 2 | Example 2 | Example 3 |
|---|---|---|---|
| Item: | | | |
| Condenser | None | 1 m.$^2$ (400 kg./hr. VC[1] reflux) | |
| Time at which stirring was stopped | 8 hours after the start of polymerization | 8 hours after the start of polymerization | |
| Time at which the polymerization inhibitor was added | 3 minutes after the stoppage of stirring | 3 minutes after the stoppage of stirring | |
| Amount of polymerization inhibitor added | 1,000 p.p.m. of tertiary-butylcatechol/VC[1] | 1,000 p.p.m. of tertiary-butylcatechol/VC[1] | |
| N$_2$ gas pressed in | None | None | 20 liters |
| Stoppage of polymerization | 90 min. later 40% | 15 min. later 92% | 15 min. later 98% |

[1] VC means vinyl chloride.

EXAMPLES 4, 5 and 6

A stainless steel polymerization vessel (capacity: 1000 liters), equipped with an external stirrer and having a condenser (heat-exchange area: 1 m.$^2$) disposed within that portion of the vessel adapted to contain the gaseous phase of the polymerization system, was evacuated and filled with nitrogen gas. 250 kg. of vinyl chloride, 500 kg. of deionized water, 250 g. of partially saponified polyvinyl acetate and 62.5 g. of diisopropyl peroxydicarbonate were charged into the vessel and the temperature within the vessel was raised to 56° C., thereby initiating polymerization. During the polymerization, bisphenol was added as a polymerization inhibitor in order to determine its ability to control the polymerization velocity or stop the polymerization reaction. The results obtained, as shown in Table 2, proved that the operation of the condenser was very effective in both cases.

TABLE 2

| Experiment number | Control 3 | Example 4 | Control 5 | Example 6 | Control 5 | Example 5 |
|---|---|---|---|---|---|---|
| Item: | | | | | | |
| Condenser (amount of reflux) | Not used | Used (200 kg./hr. VC[1]) | Not used | Used (200 kg./hr. VC[1]) | Not used | Used (200 kg./hr. VC[1]) |
| Time at which stirring was stopped | Stirring was not stopped | | 7 hours after the start of polymerization | 7 hours after the start of polymerization | 7 hours after the start of polymerization | 7 hours after the start of polymerization |
| Time at which the polymerization inhibitor was added | 7 hours after the start of polymerization | 7 hours after the start of polymerization | 2 seconds after the stoppage of stirring | 2 seconds after the stoppage of stirring | 2 seconds after the stoppage of stirring | 2 seconds after the stoppage of stirring |
| Amount of polymerization inhibitor added, p.p.m./VC[1] | 10 | 10 | 100 | 100 | 500 | 500 |
| Conversion rate at the time of the addition of the polymerization inhibitor | 65% | 65% | 65% | 65% | 65% | 65% |
| Stoppage of polymerization | 20 min. later 15% | 10 min. later 35% | 20 min. later 45% | 10 min. later 70% | 20 min. later 63% | 10 min. later 90% |

[1] VC means vinyl chloride.

What is claimed is:

1. In a method for controlling the polymerization rate in the suspension polymerization of vinyl chloride, said polymerization being carried out in an aqueous polymerization system containing a suspending or dispersing agent and a polymerization catalyst, the improvement which comprises adding to the polymerization system a polymerization inhibitor while condensing gaseous vinyl chloride monomer produced during the polymerization reaction and returning the condensed vinyl chloride back to the polymerization system, thereby imparting agitation to the polymerizaion system, whereby uniform distribution of the polymerization inhibitor in the polymerization system is insured and the polymerization reaction rate is controlled.

2. The method as claimed in claim 1 wherein said suspending agent is partially saponified polyvinyl acetate, cellulose ether or gelatin, said dispersing agent is calcium carbonate, magnesium carbonate, barium sulfate, titanium white or alumina, and said catalyst is an organic peroxide or an azo compound.

3. The method as claimed in claim 2 wherein said organic peroxide is lauroyl peroxide, benzoyl peroxide, isopropyl peroxydicarbonate or acetyl cyclohexylsulfonyl peroxide and said azo compound is azobisisobutylonitrile or dimethylvaleronitrile.

4. The method as claimed in claim 1 wherein said polymerization inhibitor is hydroquinone, methyl hydroquinone, nitrobenze, bisphenol or tertiary butyl catechol.

5. The method as claimed in claim 1 wherein the polymerization system is contained in a polymerization vessel, the condensation step is carried out in a condenser communicating with the gaseous vinyl chloride monomer contained in the vessel and the ratio of the area of the condenser to the volume of the vessel is at least 0.01.

6. The method as claimed in claim 5 wherein said ratio is 0.5 to 2.0.

7. The method as claimed in claim 1 further including the step of introducing inert gas into the aqueous polymerization system to enhance agitation.

8. A method according to claim 1 wherein the only agitation used to mix the inhibitor with the polymerization system is provided by the vaporization of the condensed monomer.

References Cited
UNITED STATES PATENTS

| | | | |
|---|---|---|---|
| 2,694,700 | 11/1954 | Shanta | 260—95 R |
| 2,528,469 | 10/1950 | Condo | 260—92.8 W |
| 3,131,033 | 4/1964 | Van Volkenburgh | 260—92.8 W |
| 3,578,649 | 6/1964 | Badguerahanian | 260—92.8 W |

JOSEPH L. SCHOFER, Primary Examiner

R. S. BENJAMIN, Assistant Examiner